Patent text

2,744,900

PRODUCTION OF NEW DERIVATIVES OF BARBITURIC ACID

Walter Reppe and Otto Schlichting, Ludwigshafen (Rhine), and Franz Westphal, Ludwigshafen (Rhine)-Oppau, Germany, assignors to Badische Anilin- & Soda-Fabrik Aktiengesellschaft, Ludwigshafen (Rhine), Germany No Drawing. Application March 1, 1954, Serial No. 413,456

Claims priority, application Germany March 5, 1953

6 Claims. (Cl. 260—257)

This invention relates to new, valuable derivatives of barbituric acid.

We have found that new, valuable derivatives of barbituric acid are obtained by condensing derivatives of cyclo-octane or cyclo-octene which are capable of reacting with activated CH-groups with barbituric acid or with derivatives or preliminary products thereof which contain an active CH-group, and if necessary subsequently closing the barbituric acid ring by the usual methods.

Suitable derivatives of cyclo-octane or cyclo-octene capable of reacting with activated CH-groups are for example cyclo-octanone, cyclo-octyl bromide, 1.2-dibromo-cyclo-octane or $\Delta 2.3$-cyclo-octenyl bromide-(1).

As partners in the condensation there may be mentioned besides barbituric acid itself, its monoalkyl derivatives, as for example 5-methylbarbituric acid, 5-ethylbarbituric acid, 5-propyl-, 5-butyl- and 5-allylbarbituric acids, and also the derivatives alkylated on the nitrogen atoms of the barbituric acid ring, such as 3-methyl- or 3.5-dimethyl-barbituric acid. As condensable preliminary products there may be mentioned, inter alia, the malonic acid esters, as for example diethyl malonate, and also cyanoacetic acid esters and malonodinitrile and their derivatives which are monoalkylated on the methylene carbon atom, such as the methyl-, ethyl-, propyl-, butyl- or allyl-malonic acid diethyl esters, which can be converted in known manner into barbituric or thiobarbituric acids by condensation with cyanamide, urea, thiourea, methyl urea or guanidine.

For the condensation of the cyclo-octanone with the said barbituric acids or their preliminary products mentioned above it is preferable to heat the components in glacial acetic acid solution with the addition of acetamide, formamide, piperidine or sodium acetate in such manner that the glacial acetic acid distils off with the water formed. In this way, for example from cyanoacetic acid ethyl ester, which is preferably used in excess, there is obtained in a good yield $\Delta 1.2$-cyclo-octenyl-cyanoacetic acid ethyl ester which can then be converted by known methods, as for example by heating with urea in the presence of sodium ethylate, into 4-imino-5-($\Delta 1'2'$-cyclo-octenyl)-barbituric acid from which 5-($\Delta 1'2'$-cyclo-octenyl)-barbituric acid is obtained by saponification with acids.

The condensation of cyclo-octyl bromide or of $\Delta 2.3$-cyclo-octenyl bromide with barbituric acids or their preliminary products mentioned above is carried out in the presence of strong bases, such as sodium alcoholate; it is advantageous to use the alkali metal derivatives of the barbituric acids or of the said preliminary products. When using 1.2-dibromo-cyclo-octane as the initial material, it is preferable to use twice the amount of a base, as for example of sodium ethylate, in order to combine with the hydrogen bromide split off.

The barbituric acids or thiobarbituric acids substituted in 5 position by a cyclo-octyl or cyclo-octenyl radical thus obtainable have valuable sedative and hypnotic properties with very slight toxicity. They are superior to the known barbituric acids substituted in 5 position by cyclohexyl or cyclohexenyl groups, inter alia, by the fact that sleep produced therewith is better and that no unfavourable after-effects ensue. Their strong spasmolytic and neurotropic action is also very remarkable and valuable so that they are suitable alone or in combination with other agents as analgesics. The 5-cyclo-octenyl-5-alkyl-barbituric acids are superior in their spasmolytic action not only to the analogous 5-cyclohexenyl derivatives but also to the 5-cyclo-heptenyl-5-alkyl-barbituric acids.

The following examples will further illustrate this invention but the invention is not restricted to these examples. The parts are parts by weight.

*Example 1*

126 parts of cyclo-octanone and 21 parts of acetamide are dissolved in 300 parts of glacial acetic acid. 126 parts of cyanoacetic acid ethyl ester are introduced and the mixture is heated in such a way that the glacial acetic acid distils off together with the water formed within about 4 hours. The residue is washed with water and sodium carbonate solution, dried with sodium sulfate and distilled at reduced pressure. First there pass over 56 parts of a mixture of about equal parts of cyanoacetic acid ethyl ester and cyclo-octanone at 54° to 62° C. at 1.5 torr. Then there pass over 142 parts of $\Delta 1.2$-cyclo-octenyl-cyanoacetic acid ethyl ester at 125° to 130° C. at 0.7 torr. The mixture of the initial materials passing over as first runnings yields a further 29.4 parts of the cyclo-octenyl derivative upon fresh reaction.

442 parts of the $\Delta 1.2$-cyclo-octenyl-cyanoacetic acid ethyl ester thus obtained are introduced while stirring and cooling with ice into a solution of 46 parts of metallic sodium in 630 parts of absolute alcohol. 260 parts of ethyl bromide are allowed to flow in gradually. The mixture is first heated for an hour at about 40° C. and is then allowed to boil under reflux until it has a neutral reaction. The alcohol is then evaporated off at reduced pressure, water is added to the residue, the oily layer is separated off and the aqueous layer extracted twice with ether. The oily layer and the ethereal extracts united therewith are dried with calcium chloride and freed from ether. The resultant 5-ethyl-5-($\Delta 1'2'$-cyclo-octenyl)-cyanoacetic acid ethyl ester boils at 112° to 115° C. at 0.4 torr.

64.5 parts of sodium metal are dissolved in 1100 parts of absolute alcohol and there are introduced while cooling and stirring first 168 parts of urea and then 350 parts of the ester described in the preceding paragraph, the mixture then being boiled under reflux for 8 hours. The alcohol is then distilled off under reduced pressure. The residue is dissolved in water and the 4-imino-5-ethyl-5-($\Delta 1'2'$-cyclo-octenyl)-barbituric acid formed is precipitated with dilute hydrochloric acid. After dissolving it in dilute hydrochloric acid and reprecipitating it with ammonia it melts at 254° to 256° C. with decomposition.

40 parts of this product are boiled under reflux for 3 hours with five times the amount of 25% hydrochloric acid. After cooling, the resultant 5-ethyl-5-($\Delta 1'2'$-cyclo-octenyl) barbituric acid is filtered off. After recrystallisation from dilute alcohol it forms colourless crystals of the melting point 198° C. If in the second stage, instead of ethyl bromide, the equivalent amount of n-propyl bromide is used, there is obtained by the same methods the 5-n-propyl-5-($\Delta 1.2$-cyclo-octenyl)-cyanoacetic acid ethyl ester (B. P. 130° to 133° C. at 0.4 torr) and, by its condensation with urea and saponification, the 5-n-propyl-5-($\Delta 1'.2'$-cyclo-octenyl)-barbituric acid of the melting point 163° to 164° C. are obtained. If n-butyl chloride is used, there is obtained as the end product 5-butyl-5-($\Delta 1'2'$-cyclo-octenyl)-barbituric acid of the melting point 159° to 160° C. which is especially suitable as a soporific.

*Example 2*

239 parts of methylmalonic acid diethyl ester are introduced while cooling with ice and stirring into a cold solution of 32 parts of sodium metal in 400 parts of absolute alcohol. Then while stirring, but without further cooling, 260 parts of 1-bromo-Δ2.3-cyclo-octene are allowed to flow in gradually. The reaction mixture becomes hot spontaneously and the separation of sodium bromide commences. The whole is heated under reflux until the mixture has a neutral reaction, the alcohol is distilled off under reduced pressure, water is added to the residue, the oily layer is separated, the aqueous layer is extracted several times with ether and the oily layer united with the ethereal extracts dried over calcium chloride. After evaporating the ether, the resultant methyl-(Δ2.3-cyclo-octenyl)-malonic acid diethyl ester is distilled at reduced pressure. It passes over at 135° to 137° C. at 0.6 torr.

Into a solution of 78 parts of sodium metal in 740 parts of absolute methanol there are introduced while stirring first 157 parts of finely powdered dicyandiamide and then 480 parts of methyl-(Δ2.3-cyclo-octenyl)-malonic acid diethyl ester, the mixture then being boiled under reflux for about 10 hours. After distilling off the methanol, the residue is dissolved in 340 parts of water and the resultant 1-cyano-2-imino-5-methyl-5-(Δ2'3'-cyclo-octenyl)-barbituric acid is precipitated by adding dilute sulfuric acid while cooling. It is filtered off by suction, washed thoroughly with water and dried at about 120° C. After recrystallisation from dilute alcohol it has a melting point of 240° to 242° C.

By boiling for 6 hours with six to eight times the amount of 20% sulfuric acid, there is obtained therefrom 5-methyl-5-(Δ2'3'-cyclo-octenyl)-barbituric acid which melts at 261° to 262° C. after recrystallisation from dilute alcohol.

By dissolving 310 parts of 1-cyano-2-imino-5-methyl-5-(Δ2'3'-cyclo-octenyl)-barbituric acid in 3500 parts of 1-normal caustic soda solution and allowing 284 parts of dimethyl sulfate to drip in gradually while stirring at a maximum temperature of 40° C., there is obtained, after acidification with dilute sulfuric acid in the cold, 1-cyano-2-imino-3.5-dimethyl-5-(Δ2'3'-cyclo-octenyl)-barbituric acid which melts at 158° C. after recrystallisation from dilute alcohol. By boiling for 6 hours with six times the amount of 20% sulfuric acid, this product is saponified to 3.5-dimethyl-5-(Δ2'3'-cyclo-octenyl)-barbituric acid which melts at 164° to 165° C. after recrystallisation from a mixture of absolute alcohol and petroleum ether.

*Example 3*

An alcoholic solution of sodium ethylmalonic acid diethyl ester containing an excess of sodium alcoholate is prepared in the usual way from 139 parts of ethylmalonic acid diethyl ester, 34 parts of sodium metal and 435 parts of absolute alcohol. 200 parts of 1.2-dibromocyclo-octane are allowed to flow gradually into this solution while stirring but without cooling. The mixture is heated under reflux for about 12 hours until it has a neutral reaction.

The ethyl-(Δ2.3-cyclooctenyl)-malonic acid diethyl ester isolated therefrom as in Example 2 boils at 119° to 123° C. at 0.4 torr.

Into a solution of 6.6 parts of sodium metal in 125 parts of absolute alcohol there are added while stirring first 15 parts of thiourea and, as soon as this has dissolved, 42 parts of the ester described in the preceding paragraph. The mixture is boiled under reflux for about 8 hours, the alcohol then being distilled off and the residue dissolved in water. The resultant alcoholic solution is extracted with ether in order to remove unreacted initial material; the aqueous layer is then acidified with acetic acid, the 5-ethyl-5-(Δ2'3'-cyclooctenyl)-thiobarbituric acid thus being precipitated. It melts after recrystallisation from dilute alcohol at 190° to 191° C.

If 12 parts of urea are used instead of thiourea, 5-ethyl-5-(Δ2'3'-cyclo-octenyl)barbituric acid having the melting point 198° to 199° C. is obtained by the same manner of operation.

*Example 4*

156 parts of 5-monoethylbarbituric acid are dissolved in 500 parts of 2-n-caustic potash solution, and 189 parts of alpha-bromocyclo-octene are introduced into the solution at room temperature while stirring. Ethanol is allowed to flow in small portions into the resultant mixture until a homogeneous solution has been formed and this is then boiled under reflux for about 8 hours. The bulk of the added ethanol is then distilled off, whereupon the 5-(Δ2'3'-cyclo-octenyl)-5-ethyl-barbituric acid crystallises out; after recrystallisation from dilute alcohol it melts at 198° to 199° C.

What we claim is:

1. Derivatives of barbituric acid of the general formula

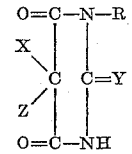

wherein R represents a member of the group consisting of hydrogen, methyl and ethyl, X represents a member of the group consisting of hydrogen and lower alkyl groups containing up to 4 carbon atoms, Y stands for a member of the group consisting of oxygen and sulfur and Z is a member of the group consisting of Δ1.2- and Δ2.3-cyclooctenyl.

2. 5-n-propyl-5-(Δ1'.2'-cyclooctenyl)barbituric acid.
3. 5-n-butyl-5-(Δ1'.2'-cyclooctenyl)barbituric acid.
4. 5-ethyl-5-(Δ1'.2'-cyclooctenyl)barbituric acid.
5. 5-ethyl-5-(Δ2'.3'-cyclooctenyl)thiobarbituric acid.
6. 5-ethyl-5-(Δ2'.3'-cyclooctenyl)barbituric acid.

References Cited in the file of this patent
FOREIGN PATENTS

| | | |
|---|---|---|
| 349,455 | Great Britain | May 31, 1931 |
| 380,841 | Great Britain | Sept. 26, 1932 |
| 510,543 | Great Britain | Aug. 2, 1939 |
| 549,106 | Great Britain | Nov. 6, 1942 |